United States Patent
Uchino et al.

(10) Patent No.: US 11,375,460 B2
(45) Date of Patent: Jun. 28, 2022

(54) USER EQUIPMENT

(71) Applicant: NTT DOCOMO, INC., Tokyo (JP)

(72) Inventors: Tooru Uchino, Tokyo (JP); Ryosuke Osawa, Tokyo (JP); Kazuki Takeda, Tokyo (JP); Kazuaki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/967,864

(22) PCT Filed: Feb. 15, 2018

(86) PCT No.: PCT/JP2018/005355
§ 371 (c)(1),
(2) Date: Aug. 6, 2020

(87) PCT Pub. No.: WO2019/159302
PCT Pub. Date: Aug. 22, 2019

(65) Prior Publication Data
US 2021/0051605 A1    Feb. 18, 2021

(51) Int. Cl.
*H04W 52/36* (2009.01)
*H04W 52/14* (2009.01)
*H04W 52/24* (2009.01)

(52) U.S. Cl.
CPC ....... *H04W 52/365* (2013.01); *H04W 52/146* (2013.01); *H04W 52/242* (2013.01)

(58) Field of Classification Search
CPC .. H04W 52/365; H04W 52/18; H04W 52/146
(Continued)

(56) References Cited

U.S. PATENT DOCUMENTS

| 2013/0250889 A1* | 9/2013 | Kim | H04W 52/146 370/329 |
|---|---|---|---|
| 2014/0153534 A1* | 6/2014 | Kim | H04W 52/146 370/329 |

(Continued)

FOREIGN PATENT DOCUMENTS

JP    2017/536774 A    12/2017

OTHER PUBLICATIONS

Asustek: "Pathioss reference change for triggering PHR", SGPP Draft; R2-1801899, 3rd Generation Partnership Project (3GPP), vol. RAN WG2, No. Athens, Greece; Feb. 26, 2018-Mar. 2, 2018 Feb. 14, 2018 (Feb. 14, 2018), XP051399036. (Year: 2018).*

(Continued)

*Primary Examiner* — John J Lee
(74) *Attorney, Agent, or Firm* — Osha Bergman Watanabe & Burton LLP

(57) ABSTRACT

A user equipment in a radio communication system including the user equipment and a base station, including: an uplink transmission power information calculation unit configured to calculate uplink transmission power information of a serving cell using a parameter that may be changed dynamically; and a signal transmission unit configured to include, in control information in which the uplink transmission power information is set, identification information for identifying a parameter used for calculation of the uplink transmission power information, and to transmit the control information in which the identification information is included to the base station.

4 Claims, 10 Drawing Sheets

(58) Field of Classification Search
USPC .......................... 455/522, 69, 68, 452.1, 509
See application file for complete search history.

(56) References Cited

U.S. PATENT DOCUMENTS

| | | | | |
|---|---|---|---|---|
| 2014/0221038 A1* | 8/2014 | Nakashima | ......... | H04W 52/365 |
| | | | | 455/522 |
| 2017/0367056 A1 | 12/2017 | Wei | | |
| 2019/0349866 A1* | 11/2019 | Lin | ...................... | H04B 7/0617 |
| 2020/0100193 A1* | 3/2020 | Cheng | ............... | H04W 72/1268 |
| 2020/0100194 A1* | 3/2020 | Nangia | ................... | H04L 5/005 |

OTHER PUBLICATIONS

International Search Report issued in Application No. PCT/JP2018/005355, dated May 15, 2018 (5 pages).
Written Opinion issued in International Application No. PCT/JP2018/005355, dated May 15, 2018 (4 pages).
3GPP TS 36.213 V15.0.0, Release 15; "3rd Generation Partnership Project; Technical Specification Group Radio Access Network; Evolved Universal Terrestrial Radio Access (E-UTRA); Physical layer procedures;" Dec. 2017; Sophia Antipolis Valbonne, France (494 pages).
3GPP TS 38.213 V15.0.0, Release 15; "3rd Generation Partnership Project; Technical Specification Group Radio Access Network; NR; Physical layer procedures for control;" Dec. 2017; Sophia Antipolis Valbonne, France (56 pages).
3GPP TS 36.321 V15.0.0, Release 15; "3rd Generation Partnership Project; Technical Specification Group Radio Access Network; Evolved Universal Terrestrial Radio Access (E-UTRA); Medium Access Conlrol (MAC) protocol specification;" Dec. 2017; Sophia Antipolis Valbonne, France (109 pages).
3GPP TS 38.321 V15.0.0, Release 15; "3rd Generation Partnership Project; Technical Specification Group Radio Access Network; NR; Medium Access Control (MAC) protocol specification;" Dec. 2017; Sophia Antipolis Valbonne, France (55 pages).
3GPP TSG RAN WG1 Meeting AH 1801; R1-1800472; "PHR for CA;" Samsung; Jan. 22-26, 2018; Vancouver, Canada (3 pages).
Office Action issued in the counterpart Korean Patent Application No. 10-2020-7022196, dated Apr. 13, 2021 (10 pages).
ZTE, Sanechips; "Offline proposals for NR power control in non-CA aspects"; 3GPP TSG RAN WG1 Meeting AH 1801, R1-1801165; Vancouver, Canada; Jan. 22-26, 2018 (6 pages).
Huawei, HiSilicon; "Remaining details of PHR"; 3GPP TSG RAN WG1 Meeting AH 1801, R1-1800526; Vancouver, Canada; Jan. 22-26, 2018 (5 pages).
Extended European Search Report in counterpart European Application No. 18 90 6191 4 dated Jul. 30, 2021 (13 pages).
Asustek; "Pathloss reference change for triggering PHR"; 3GPP TSG-RAN WG2 Meeting #101, R2-1801899; Athens, Greece; Feb. 26-Mar. 2, 2018 (3 pages).
NTT DOCOMO et al.; "Updated offline proposal on PHR"; 3GPP TSG-RAN WG1 NR Ad-Hoc Meeting, R1-1801160; Vancouver, Canada; Nov. 22-26, 2017 (3 pages).
Examination Report issued in Indian Application No. 202037038994 dated Sep. 16, 2021 (5 pages).
Office Action in counterpart Japanese Patent Application No. 2019-571897 dated Oct. 19, 2021 (4 pages).
Motorola Mobility et al.; "On non-CA NR UL power control"; 3GPP TSG RAN WG1 #91, R1-1720928; Reno, NV, USA Nov. 27-Dec. 1, 2017 (14 pages).
Samsung; "On PHR Requirements and Calculation"; 3GPP TSG RAN WG1 meeting 91, R1-1720363; Reno, USA Nov. 27-Dec. 1, 2017 (6 pages).
ZTE; "Offline summary for AI 7.6 NR UL power control"; 3GPP TSG RAN WG1 Meeting #90bis, R1-1718883; Prague, Czechia; Oct. 9-13, 2017 (23 pages).
Office Action in counterpart Korean Patent Application No. 10-2020-7022196 dated Nov. 30, 2021 (6 pages).

* cited by examiner

FIG. 5 extended PHR MAC CE

| Bitmap (for serving cell) | |
|---|---|
| PCell Pcmax, c | |
| idx | PCell PH |
| SCell#1 Pcmax, c | |
| idx | SCell#1 PH |
| SCell#2 Pcmax, c | |
| idx | SCell#2 PH |

USER EQUIPMENT

TECHNICAL FIELD

The present invention relates to a user equipment in a radio communication system.

BACKGROUND ART

Currently, radio services are widely provided by LTE (including LTE-Advanced). In 3GPP, the study and standardization of a radio communication scheme called 5G is proceeding in order to realize further increase in system capacity from LTE, further increase in data transmission speed, and further reduction in delay in the radio section. In 5G, various techniques have been studied to satisfy the requirement that the delay of the radio section be 1 ms or less while achieving throughput of 10 Gbps or more. The radio access technology that supports 5G is called NR (New Radio).

In the LTE, PHR (power headroom report) control is performed for uplink transmission power control, and it is assumed that PHR control based on PHR control in LTE is also performed in NR. In the PHR control, the user equipment UE notifies the base station of a PHR signal including a PH (power headroom), and the base station performs scheduling of UL (Uplink) transmission of the user equipment UE, transmission power control, and the like based on the PHR signal.

PRIOR ART DOCUMENT

Non-Patent Documents

[Non-patent Document 1] 3GPP TS 36.213 V15.0.0 (2017 December)
[Non-patent Document 2] 3GPP TS 38.213 V15.0.0 (2017 December)
[Non-patent Document 3] 3GPP TS 36.321 V15.0.0 (2017 December)
[Non-patent Document 4] 3GPP TS 38.321 V15.0.0 (2017 December)

SUMMARY OF THE INVENTION

Problem to be Solved by the Invention

When UL CA (carrier aggregation) is performed, the user equipment UE reports PH in all serving cells irrespective of presence or absence of UL transmission (Non-Patent Documents 3, 4). The user equipment UE can calculate the PH, for a serving cell that performs UL transmission, using parameters used for UL transmission.

In addition, for a serving cell in which UL transmission is not performed, the user equipment UE may calculate the PH by, for example, selecting a certain parameter among multiple parameters configured from the base station. In this case, however, the base station 10 may not be able to grasp the parameters used to calculate the PH in the prior art. Therefore, it is impossible to grasp path loss observed in the user equipment UE, and it is possible that scheduling and transmission power control for the user equipment UE cannot be appropriately performed.

The present invention has been made in view of the above-described points, and is intended to provide a technology that enables a base station to grasp a parameter used by the user equipment to calculate uplink transmit power information in a serving cell in which uplink transmission is not performed.

Means for Solving Problems

According to the disclosed technology, there is provided a user equipment in a radio communication system including the user equipment and a base station, including:

an uplink transmission power information calculation unit configured to calculate uplink transmission power information of a serving cell using a parameter that may be dynamically changed; and a signal transmission unit configured to include, in control information in which the uplink transmission power information is set, identification information for identifying a parameter used for calculation of the uplink transmission power information, and to transmit the control information in which the identification information is included to the base station.

Effect of Invention

According to the disclosed technology, a technology is provided that enables the base station to grasp a parameter used by the user equipment to calculate uplink transmission power information in a serving cell in which uplink transmission is not performed.

BRIEF DESCRIPTION OF THE DRAWINGS

FIG. 5 is a diagram illustrating an example of PHR MAC CE format in Example 1.

MODES FOR CARRYING OUT THE INVENTION

Hereinafter, an embodiment of the present invention (present embodiment) will be described with reference to the drawings. It should be noted that the embodiments described below are only one example, and the embodiments to which the present invention is applied are not limited to the following embodiments.

It is assumed that the radio communication system of the present embodiment supports at least the communication scheme of NR.

Additionally, in the operation of the radio communication system of the present embodiment, for example, the technology specified in the existing LTE may be used in order to perform operations not specified in the specifications of NR.

(System Configuration)

Figure 1:
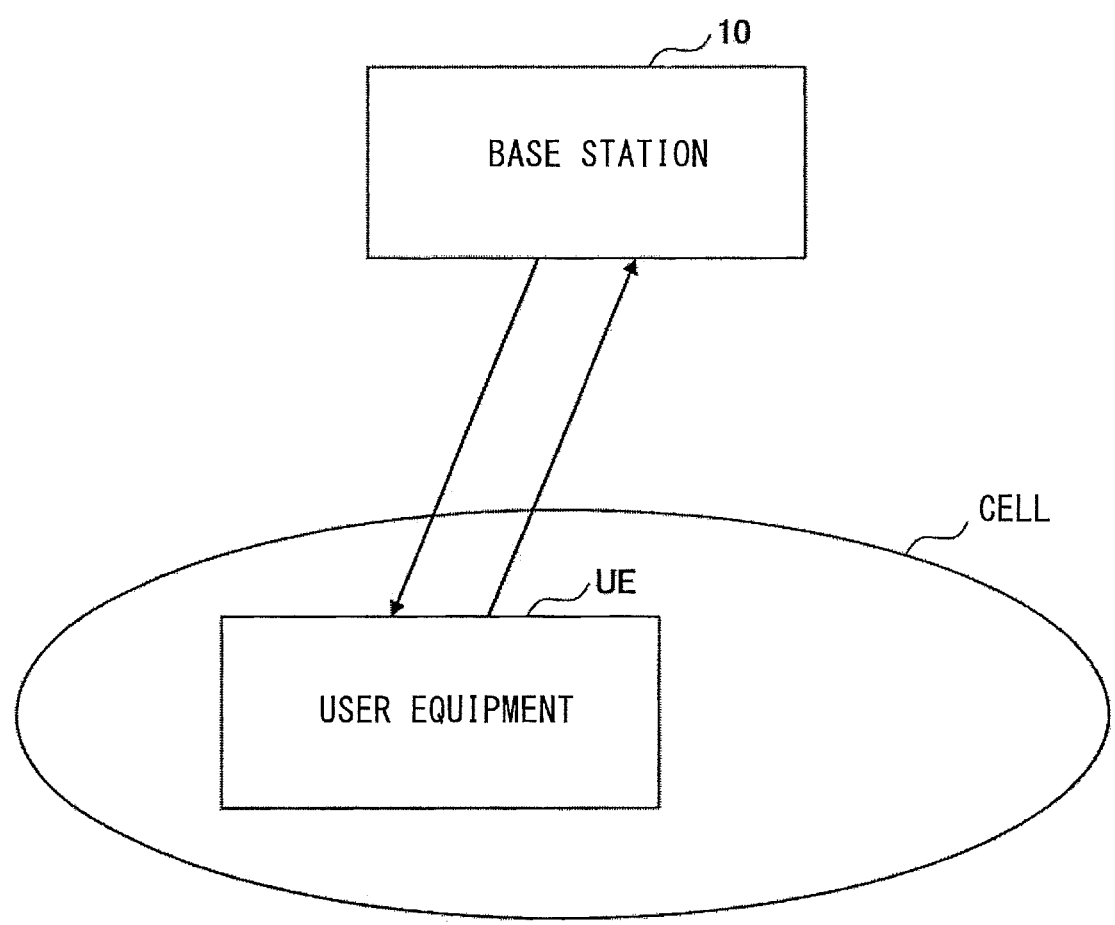
FIG. 1 is a diagram illustrating a configuration of a radio communication system according to an embodiment of the present invention.

FIG. 1 is a diagram illustrating a configuration example of a radio communication system according to the present embodiment. As shown in FIG. 1, the radio communication system according to the present embodiment includes a base station 10 that forms a cell and a user equipment UE. In the radio communication system according to the present embodiment, there is generally a plurality of user equipments UE other than one user equipment UE shown in FIG. 1. FIG. 1 illustrates one user equipment UE as an example. In addition, in general, there are a plurality of base stations other than one base station 10 shown in FIG. 1. In FIG. 1, one base station 10 is shown as an example.

Both the base station 10 and the user equipment UE have NR functions. However, both the base station 10 and the user equipment UE may include LTE functions in addition to NR functions, or may include only NR functions. Base station 10 supporting NR may be referred to as gNB.

The base station 10 and the user equipment UE include the capability to perform carrier aggregation. Carrier aggregation may be one being performed between a single base station and a user equipment UE, or may be one performed between multiple base stations and a user equipment UE. Carrier aggregation performed between multiple base stations and the user equipment UE may be referred to as dual connectivity.

Since the present embodiment relates to PHR, PHR will be described first. In this specification, the PHR is basically used to report PH (power headroom) to the base station 10. The reported signal is called a PHR signal. The PH may also be referred to as "uplink transmission power information".

<About PHR>

Since the transmission power when the user equipment UE transmits data to the base station 10 needs to be of an appropriate size, the user equipment UE calculates the UL transmission power using a predetermined formula and transmits the UL transmission power using the calculated UL transmission power. The following is an example of the above predetermined equation for the transmission power of PUSCH (Physical Uplink Shared Channel). The processing content described in this embodiment is applicable not only to the transmission of the PUSCH, but also to other channels and signals (Example: PRACH, PUCCH, SRS).

Formula 1

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \quad \text{(Formula 1)}$$

In Formula 1, $P_{CMAX,c}(i)$ is the maximum transmission power (after considering the required power backoff) in the i-th subframe of serving cell c, $M_{PUSCH,C}(i)$ is the number of resource blocks, $\Delta_{TF,c}$ is the power offset derived from MCS (Modulation Coding Scheme), $PL_c$ is the pathloss, and $f_c(i)$ is the accumulated TPC command (closed-loop power control correction). Others are broadcast parameters. Specifically, $P_{O\_PUSCH,c}$ is a reference power offset, and $\alpha_c(j)$ indicates the slope of the Fraction TPC. The pathloss is calculated (estimated) by the user equipment UE from the received power of the reference signal received by the user equipment UE from the base station 10 and the transmission power information of the reference signal received from the base station 10.

The user equipment UE inputs an allocated amount of resources and MCS to apply, etc. into the above-described predetermined formula, determines the transmission power, and performs UL transmission. When the calculated transmission power exceeds the maximum transmission power, UL transmission is performed by applying the maximum transmission power.

The base station 10 grasps the transmission power of the user equipment UE based on the formula 1 above in order to perform power control and scheduling (resource allocation, MCS determination, etc.) so that the transmission power of the user equipment UE becomes an appropriate value. However, since the pathloss is unknown among the variables in the formula 1 described above, the user equipment UE notifies the base station 10 of a PHR (power headroom reporting) signal including PH (power headroom) at a predetermined trigger (e.g., when the pathloss changes more than a predetermined value), and the base station 10 controls the transmission power of the user equipment UE based on the PHR signal.

The power headroom (PH) is a value calculated by Formula 2 below, which is the difference between the maximum transmission power (after considering the required power backoff) of the UE and an actual transmission power.

Formula 2

$$PH_{type1,c}(i) P_{CMAX,c}(i) - \{10 \log_{10}(M_{PUSCH,c}(i)) + P_{O\_PUSCH,c}(j)\alpha_c(j) \cdot PL_c \Delta_{TF,c}(i) + f_c(i)\}. \quad \text{(Formula 2)}$$

In the transmission power control in LTE, among the parameters used to calculate the transmission power, the reference pathloss, the slope of the Fraction TPC, and the closed-loop power control correction are managed only 1 set per UE, and these are applied to all UL transmission power.

In addition, for a serving cell without UL transmission at the time of UL CA (carrier aggregation), as to a parameter (which dynamically changes related to the number of PRBs, modulation methods, etc.) determined by UL assignment, PH is calculated by using a fixed parameter. That is, as shown below, a reference format is used for the parameter enclosed in a square frame for Formula 1 (Non-Patent Document 1, Non-Patent Document 2).

Formula 3

$$P_{PUSCH,c}(i) = \min\left\{\begin{array}{l} P_{CMAX,c}(i), \\ 10\log\boxed{_{10}(M_{PUSCH,c}(i))} + P_{O\_PUSCH,c}(j) + \\ \alpha_c(j) \cdot PL_c \boxed{+\Delta_{TF,c}(i)} + f_c(i) \end{array}\right\} \quad \text{(Formula 1)}$$

On the other hand, in the NR, a plurality of parameter sets can be configured and managed for a single user equipment UE so that the transmission power can be controlled more finely in accordance with the radio environment of the user equipment UE, and calculation of the PH is also calculated according to the parameter set applied at that time.

That is, for example, for a set of any parameters of PathlossReferenceIndex (index of RS used as a reference for pathloss calculation), POAlphaSetIndex (a reference power offset index), PUSCHClosedLoopIndex (index for closed-loop power control correction), a group of parameter sets that can be used by the user equipment UE is configured from the base station 10 to the user equipment UE by RRC signaling and the like, and the base station 10 specifies a parameter set that is actually used in the user equipment UE by an UL grant. The user equipment UE performs UL transmission using the specified parameter set. In addition, the user equipment UE calculates a PH using the parameter set actually used. Such control may be performed in units of individual parameters instead of in units of parameter sets. "Parameter" may be used in a broad sense, including parameter set.

In NR, the base station 10 needs to know which parameter set is used for calculating PH when receiving PH from the user equipment UE. Specifically, in addition to the parameters enclosed in the square frame, parameters enclosed in the round frame needs to be common between the base station 10 and the user equipment UE, as shown below.

Formula 4

$$P_{PUSCH,c}(i) = \min\begin{cases} P_{CMAX,c}(i), \\ 10\log_{10}(\boxed{M_{PUSCH,c}(i)}) + P\widehat{O\_PUSCH,c(j)} + \\ \widehat{\alpha_c(j)} \cdot \boxed{PL_c} + \widehat{\Delta_{TF,c}(i)} + \widehat{f_c(i)} \end{cases}$$ (Formula 1)

In the case of UL CA, it is defined that the user equipment UE reports the PH for all serving cells (regardless of presence or absence of UL transmission) (Non-Patent Documents 3 and 4). As described above, for a serving cell without UL transmission, a PH is fed back assuming that UL transmission of a specific number of PRBs and MCS were performed. This is called virtual PH. The PH calculated using a parameter set used for actual transmission is called real PH.

In the case of virtual PH, it is necessary to adjust consciousness between the base station 10 and the user equipment UE as to which parameter set was applied to calculate the PH. However, in the prior art, the base station 10 does not have means to know which parameter set is applied to the PH, and the base station 10 cannot ascertain which parameter set is applied to the PH.

Figure 2:
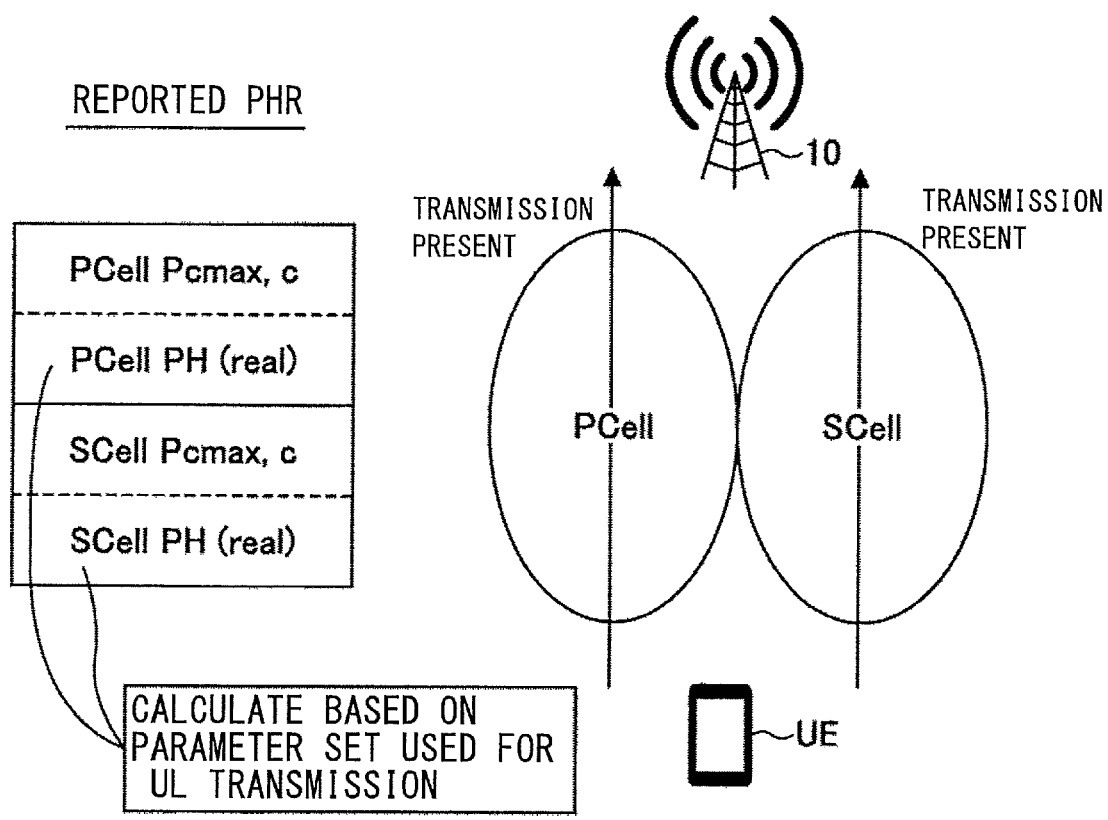
FIG. 2 is a diagram illustrating an example of PH control.

That is, as shown in FIG. 2, in UL CA, if there is UL transmission in each serving cell, the user equipment UE computes each PH using a parameter set used for UL transmission and transmits it to the base station 10. Since the base station 10 knows that the parameter set specified by the base station 10 for UE's UL transmission is used, it is possible to grasp the pathloss observed in the user equipment UE from the parameter set and the received PH.

Figure 3:
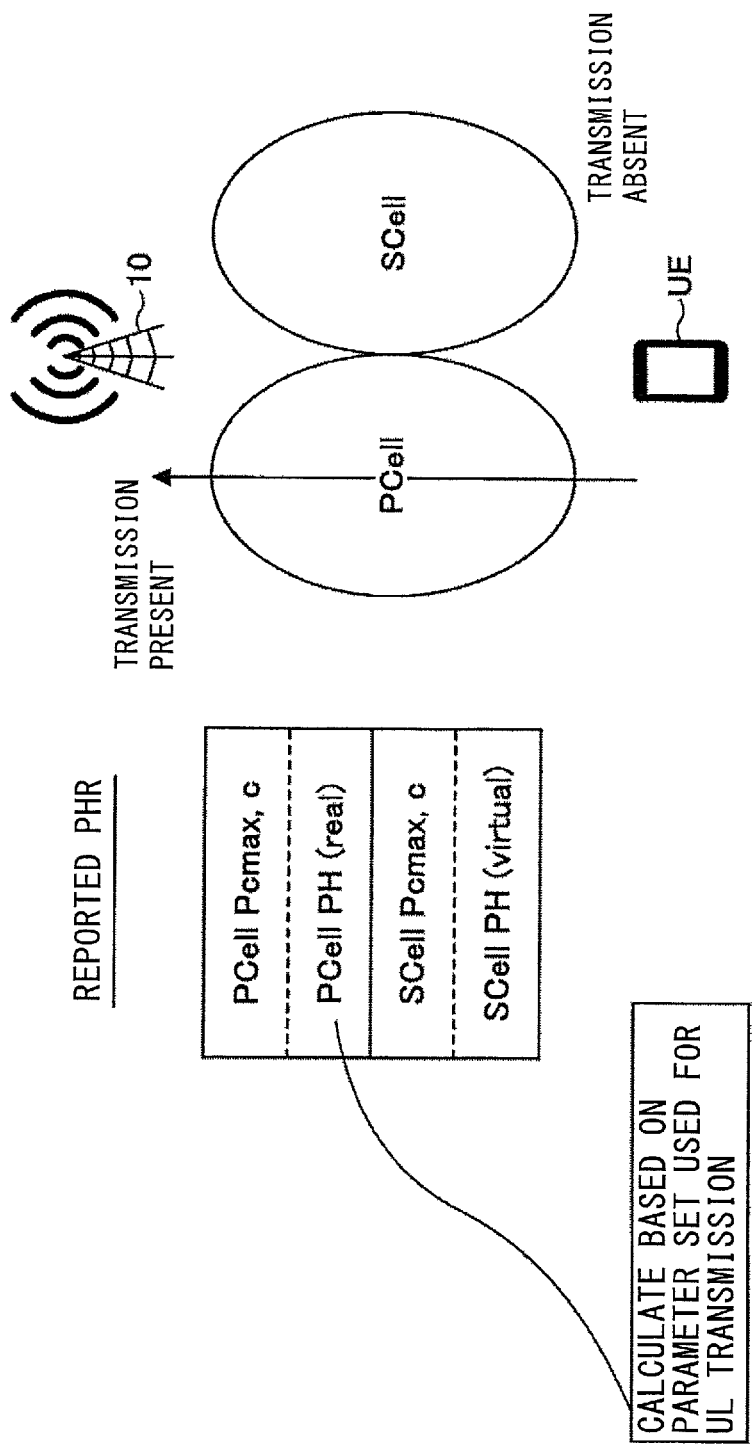
FIG. 3 is a diagram illustrating an example of PH control.

On the other hand, as shown in FIG. 3, when there is no UL transmission of a serving cell (SCell in the example of FIG. 3) in the UL CA, the user equipment UE calculates and reports a virtual PH using a parameter set as a PH of the SCell. However, since the base station 10 cannot grasp the parameter set used for the calculation of the PH, it may not be possible to grasp the pathloss observed in the user equipment UE, and it may not be possible to appropriately perform scheduling and transmission power control for the user equipment UE.

Hereinafter, Examples 1 and 2 will be described as techniques for solving this problem. In both Example 1 and Example 2, as shown in FIG. 3, it is assumed that the user equipment UE sets the virtual PH to PHR MAC CE and transmits the virtual PH in a serving cell without transmission in the UL CA.

In the UL transmission power calculation, the parameters that can be dynamically changed are not limited to the parameters enclosed in the above-described square frame and the parameters enclosed in the round frame, but more generally all parameters used for transmission power calculation can change dynamically. That is, any parameter used in the transmission power calculation may be subject to the control described in Examples 1 and 2.

The above-described "dynamically changeable parameter" is equivalent to, for example, 1) to 3) below, but is not limited to 1) to 3) below.

1) One determined upon receipt of an instruction from the base station 10. Instructions from the base station 10 include, for example, DCI, RAR, UL grant instructions, DL assignment instructions, or resource assignments detected and determined in connection therewith.

2) One determined at the timing when UL transmission is determined.

3) One determined at a timing at which UL transmission is performed (or at a timing until a predetermined period before).

Example 1

The basic operation example of Example 1 will be described with reference to FIG. 4. PH reporting is performed based on a PHR trigger. In S101, the user equipment UE detects a PHR trigger. There are following PHR triggers, for example. The following show examples of a trigger disclosed in Non-Patent Document 3.

The user equipment UE transmits a PHR signal (PHR MAC CE) in PUSCH transmission after a PHR trigger is met. In the following description, the parameter enclosed in " " is a parameter that is notified by the base station 10 to the user equipment UE by RRC signaling.

Figure 4:
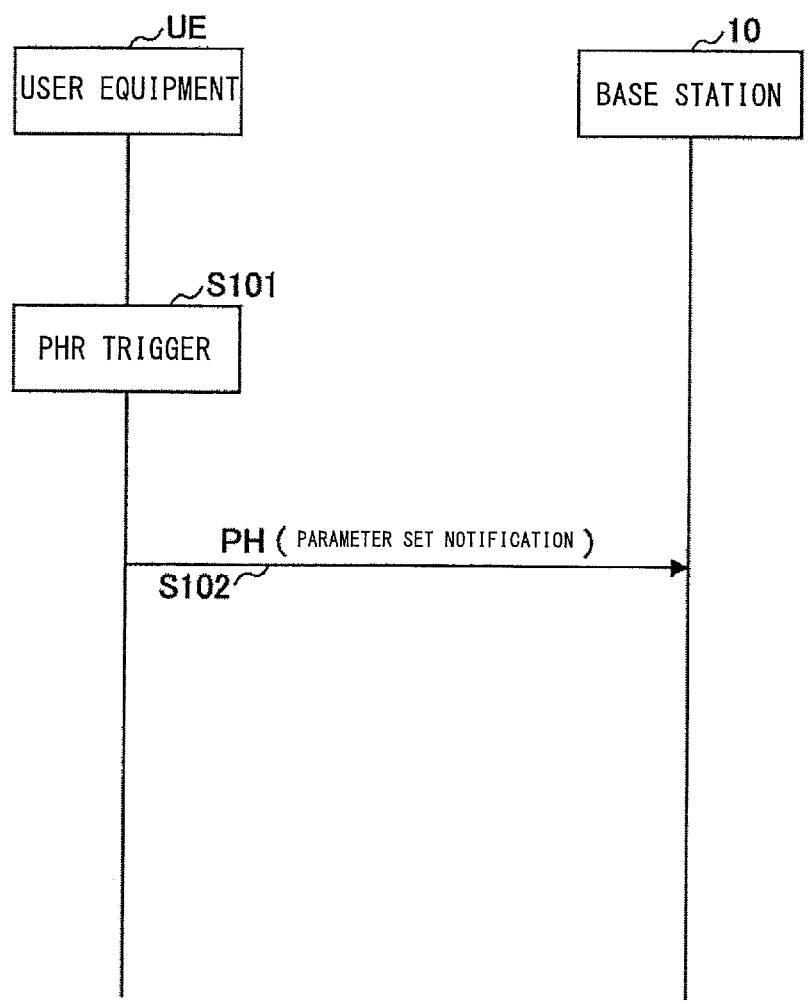
FIG. 4 is a diagram illustrating an operation example of Example 1.

"PeriodicPHR-Timer" expires;
Observe pathloss change equal to or greater than "dl-PathlossChange" in at least one or more Activated Serving Cell from the expiration of "ProhibitPHR-Timer" and the last PHR Transmission;
Configuration or Reconfiguration of PHR;
Activation of SCell configured with Uplink;
Perform power-backoff change equal to or greater than "dl-PathlossChange" in at least one or more Activated Serving Cell from the expiration of "ProhibitPHR-Timer" and the last PHR Transmission;

In the S102 of FIG. 4, the user equipment UE has an UL resource capable of transmitting PHR MAC CE and transmits PH to the base station 10 with PHR MAC CE. As described above, the situation shown in FIG. 3 is assumed here, and the configuration of the PHR MAC CE transmitted here is as shown in FIG. 3, and includes, for example, Pcmax,c of PCell, PH of PCell, Pcmax,c of SCell, and PH of SCell. Pcmax,c is set regardless of presence or absence of UL transmission. For PH, PH of the PCell with transmission is a real PH, and PH of the SCell without transmission is a virtual PH.

In Example 1, in S102 of FIG. 4, the user equipment UE explicitly notifies the base station 10 of which parameter set was used to calculate the virtual PH by a PHR MAC CE containing the virtual PH. Information indicating "which parameter set was used" (which is referred to as use parameter identification information) may be indexes of individual parameters comprising a parameter set, an index identifying a parameter set (e.g., an index such as SRI), or other information.

Note that the user equipment UE may select one of the following parameters as a parameter set to be used for calculation of the virtual PH.

- A specific parameter(s) (or combination of specific parameters) in parameters applied to transmission power, that has a large value (or combination of parameters of larger values) or a small value (or combination of parameters of small values).
- A parameter (or a combination of parameters) in parameters applied to transmission power, by which the transmission power becomes the largest, or a parameter (or a combination of parameters) in parameters applied to transmission power, by which the transmission power becomes the smallest.
- A parameter that the user equipment UE used for the last (most recent) UL transmission.
- A parameter that the user equipment UE used in RA procedure (e.g. Msg3).

Use parameter identification information may be included in the field of the virtual PH or in each of the fields of the virtual PH and the real PH. The use parameter identification information included in the real PH field may be information of a parameter set used to calculate the virtual PH or information of the parameter set used to calculate the real PH.

FIG. 5 shows an example of the format of the PHR MAC CE when the use parameter identification information (idx) is included in each of the virtual PH and real PH fields. The example of FIG. 5 shows an example where UL CA is configured by PCell, SCell #1, and SCell #2.

According to S102 of FIG. 4, the base station 10 that receives the PHR MAC CE including the use parameter identification information can accurately understand the parameter set used by the user equipment UE to calculate the PH in the SCell with no transmission. Therefore, it is possible to appropriately perform scheduling, transmission power control, etc., in the SCell with no transmission in consideration of the pathloss observed by the user equipment UE. In Example 1, since the notification is explicitly made, the base station 10 can accurately know the parameter set used for calculating the virtual PH by following dynamic changes.

Example 2

Next, Example 2 will be described. As described above, in Example 1, the user equipment UE explicitly notifies the base station 10 of the use parameter identification information. In Example 2, however, the base station 10 is able to know which parameter set was used to calculate the virtual PH without explicitly notifying (i.e., implicitly notifying) the use parameter identification information. Hereinafter, Examples 2-1 to 2-4 will be described. Examples 2-1 to 2-4 can be carried out in a suitable combination unless there is a contradiction.

Example 2-1

In Example 2-1, the user equipment UE uses a default parameter/parameter set to calculate the virtual PH. Here, "parameter/parameter set" means that the default parameters may be used in units of individual parameters or the default parameters may be used in units of parameter sets each consisting of multiple parameters.

The default parameter/parameter set is held by both the user equipment UE and the base station 10. The base station 10 determines that the PH was calculated using the default parameter/parameter set when the virtual PH is received from the user equipment UE.

The default parameter/parameter set may be defined in units of UE, per serving cell, or per RS.

The default parameter/parameter set may be explicitly specified from the base station 10 to the user equipment UE, or a parameter/parameter set associated with a specific index or parameter may be the default parameter/parameter set. For example, when a parameter/parameter set #1, a parameter/parameter set #2, and a parameter/parameter set #3 are configured by RRC signaling or the like as a group of usable parameters/parameter sets from the base station 10 to the user equipment UE, the parameter/parameter set #1 may be used as the default parameter/parameter set for the user equipment UE.

The default parameter/parameter set may be a parameter/parameter set that is specified first from the base station 10 to the user equipment UE at the time of connection of the user equipment UE.

Figure 6:
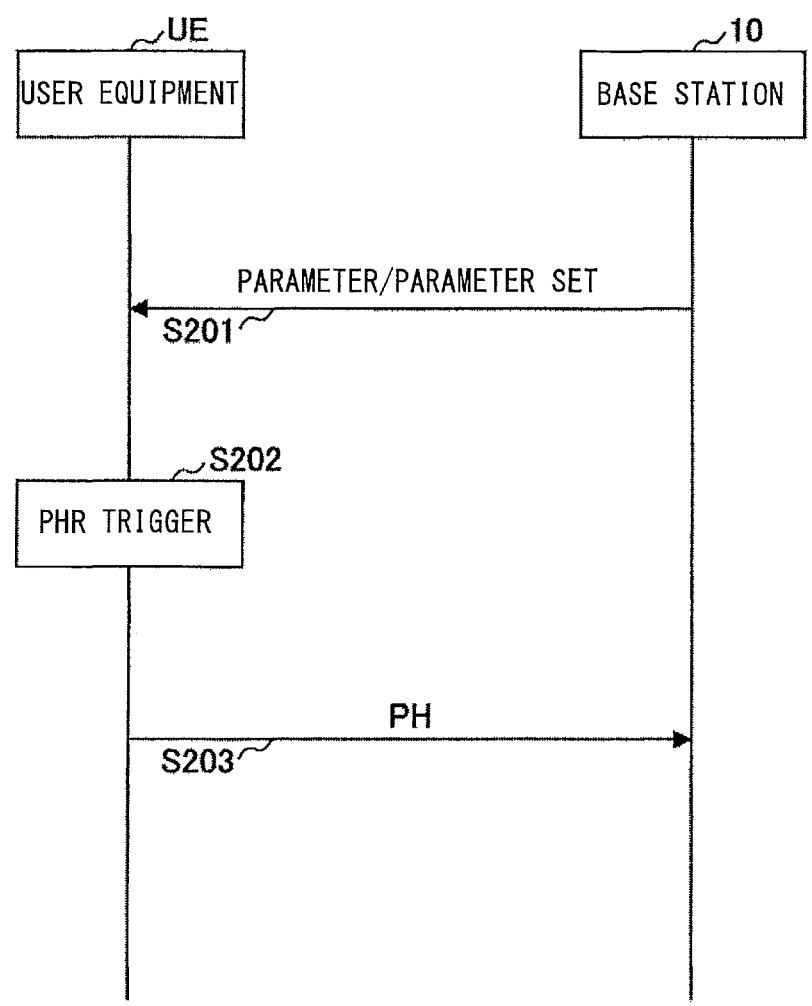
FIG. 6 is a diagram illustrating an example of operation in Example 2.

FIG. 6 shows an operation example of Example 2-1. In S201, the above-described parameter/parameter set is notified from the base station 10 to the user equipment UE. In S202, the user equipment UE detects a PHR trigger.

Here, as in the case of FIG. 4, SCell is no transmission, and the user equipment UE calculates the PH of the SCell using the parameter/parameter set received in S201, and transmits a PHR MAC CE including the PH to the base station 10 in S203.

The base station 10 determines that the virtual PH received in S203 is calculated by the parameter/parameter set transmitted in S201, and can calculate pathloss observed by the user equipment UE in the SCell from, for example, the parameter/parameter set and the virtual PH, and perform scheduling and the like in consideration of the pathloss.

Example 2-2

Figure 7:
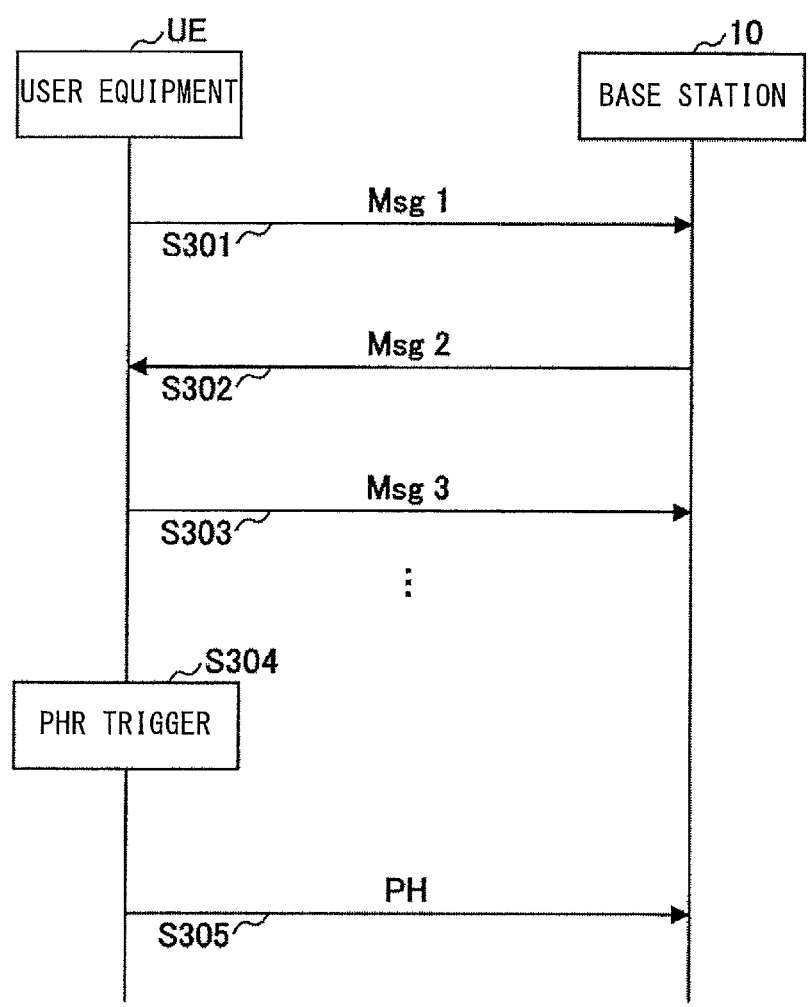
FIG. 7 is a diagram illustrating an example of operation in Example 2.

Next, Example 2-2 will be described. In Example 2-2, the user equipment UE calculates the virtual PH using a parameter/parameter set used in UL transmission (e.g., Msg3 transmission) during a RA procedure. An example of operation of Example 2-2 will be described with reference to FIG. 7.

In S301, the user equipment UE transmits a message 1 (RA sample) to the base station 10 and a message 2 (RA response) is returned from the base station 10 to the user equipment in S302.

In S303, the user equipment UE performs calculation of transmission power, mapping to radio resources, etc., based on assignment information contained in the message 2 received in the S302, and transmits a message 3 (e.g., RRC connection request). Thereafter, data communication is performed between the user equipment UE and the base station 10, for example, as shown in FIG. 2.

In S304, the user equipment UE detects a PHR trigger. At this point, as shown in FIG. 3, it is assumed that there is no transmission in the SCell. The user equipment UE calculates the PH of the SCell using the parameter/parameter set that was used to transmit the message 3 in S303, and transmits a PHR MAC CE including the PH to the base station 10 in S305.

The base station 10 determines that the virtual PH received in S305 is calculated by the parameter/parameter set used in the transmission of the message 3 of S303 (notified by the UL grant of the message 2 transmitted by the base station 10), and can calculate pathloss observed by the user equipment UE in the SCell based on the parameter/parameter set and the virtual PH, for example, and perform scheduling in consideration of the pathloss.

The user equipment UE may calculate the virtual PH using the parameter/parameter set used for transmitting the message 1.

Example 2-3

Next, Example 2-3 will be described. Example 2-3 applies a parameter/parameter set that was applied to the most recently performed UL transmission in the past, in a serving cell without UL transmission at the time of PH calculation.

For example, it is assumed that, in the UL CA illustrated in FIG. 2, from the state where SCell transmission is present, the state becomes no SCell transmission as shown in FIG. 3, and in the state illustrated in FIG. 3, the user equipment UE performs virtual PH of the SCell.

In this case, the user equipment UE calculates and reports the virtual PH of the SCell with UL no transmission by using the parameter/parameter set applied to the most recently performed UL transmission in the SCell in the state there is SCell transmission shown in FIG. 2.

The base station 10 determines that the virtual PH received from the user equipment UE is calculated by the parameter/parameter set applied to the most recently performed UL transmission in the SCell, and can calculate pathloss observed by the user equipment UE in the SCell from the parameter/parameter set and the virtual PH, for example, and perform scheduling, etc. in consideration of the pathloss.

Example 2-4

Next, Example 2-4 will be described. In Example 2-4, a parameter/parameter set used for computing the virtual PH is notified in an UL grant notified by the base station 10 to the user equipment UE, and the user equipment UE calculates the PH according to the parameter/parameter set. The UL grant may be an UL grant (i.e., an UL grant for notifying a parameter/parameter set used to calculate a Virtual PH) in a serving cell without transmission (SCell in the example of FIG. 3) for which the PH is to be calculated, or may be an UL grant in a serving cell with transmission.

Figure 8:
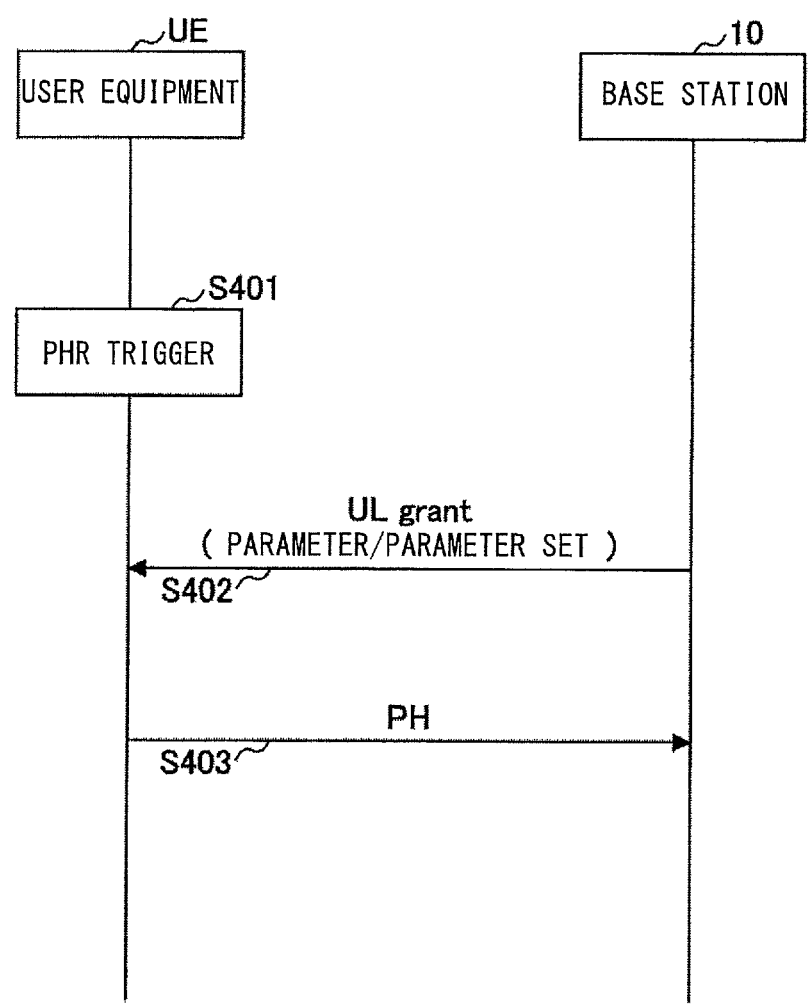
FIG. 8 is a diagram illustrating an example of operation in Example 2.

FIG. 8 shows an example of operation of Example 2-4. In S401, the user equipment UE detects a PHR trigger. In S402, the user equipment UE receives from the base station 10 an UL grant with a specified parameter/parameter set to be used to calculate the virtual PH. The UL grant reception of S402 may be performed at a timing prior to S401.

Here, SCell is no-transmission, and the user equipment UE calculates the PH of the SCell using the parameter/parameter set included in the UL grant received in S402, and transmits a PHR MAC CE including the PH to the base station 10 in S403.

The base station 10 determines that the virtual PH received in S403 was calculated by the parameter/parameter set transmitted in S402, and can calculate a pathloss observed by the user equipment UE in the SCell from, for example, the parameter/parameter set and the virtual PH, and perform scheduling in consideration of the pathloss.

In Example 2, recognition of the parameter/parameter set used for the virtual PH calculation can be matched between the user equipment UE and the base station 10 without causing an increase in overhead.

Other Examples

For each operation in Examples 1 and 2 described above, the user equipment UE may notify the base station 10 of UE capability information indicating whether or not the operation is applicable.

The UE capability information includes, for example, one of the following (1) to (3) information, or a combination of any plural pieces (or all) of the following (1) to (3) information.

(1) Applicable RS (reference signal to be observed for pathloss measurement), parameter/parameter set.

(2) Applicable Channel type, signal type (or the number of applicable Channel types, the number of Signal types), or applicable PH type for each Channel type, or Signal type.

(3) Identification information of serving cell(s) that is(are) applicable. Alternatively, the number of serving cells in which the operation is applicable.

In addition, the user equipment UE may report the UE capability information in units of RAT, in units of UE, in units of MAC entity, in units of cell group, in units of band combination, in units of band, or in units of CC.

(Equipment Configuration)

Next, a functional configuration example of the user equipment UE and the base station 10 that execute the process operation described above will be described. The user equipment UE and the base station 10 have all of the functions described in the present embodiment. However, the user equipment UE and the base station 10 may include only some of the functions described in this embodiment.

<User Equipment>

Figure 9:
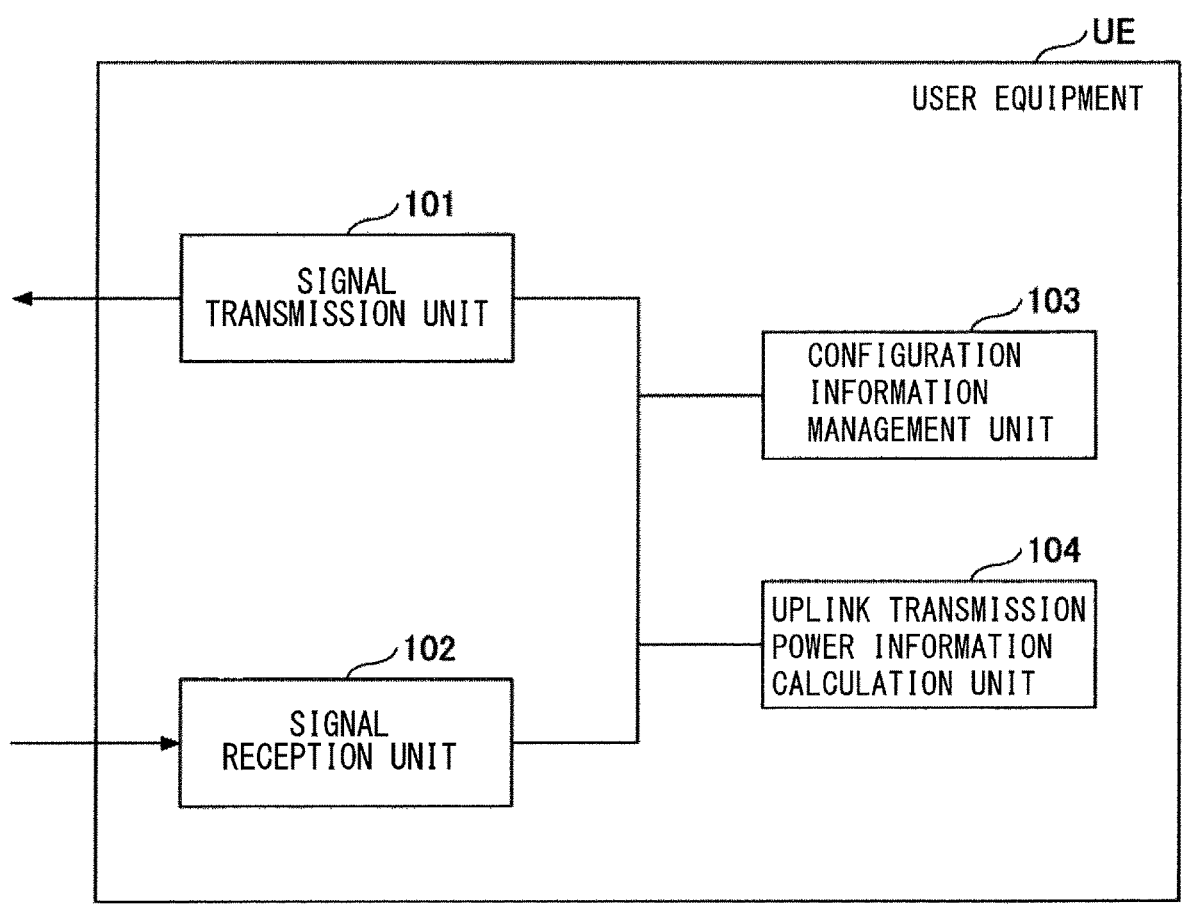
FIG. 9 is a diagram illustrating an example of a functional configuration of a user equipment UE according to an embodiment.

FIG. 9 is a diagram illustrating an example of a functional configuration of the user equipment UE. As illustrated in FIG. 9, the user equipment UE includes a signal transmission unit 101, a signal reception unit 102, a configuration information management unit 103, and an uplink transmission power information calculation unit 104. The functional configuration shown in FIG. 9 is only one example. As long as the operation according to the present embodiment can be executed, the name of the functional classification and the functional portion may be any one. The signal transmission unit 101 may be referred to as a transmitter, and the signal reception unit 102 may be referred to as a receiver.

The signal transmission unit 101 creates a transmission signal from the transmission data and transmits the transmission signal by radio. The signal reception unit 102 receives a variety of signals by radio and acquires a higher layer signal from the received physical layer signal. The signal reception unit 102 includes a function for measuring signals such as RS and acquiring quality and the like. The signal transmission unit 101 and the signal reception unit 102 have a carrier aggregation function.

The configuration information management unit 103 stores various configuration information received from the base station 10 by the signal reception unit 102, and stores preconfigured configuration information. Examples of configuration information include various parameters. The uplink transmission power information calculation unit 104 calculates information such as pathloss, PH, and Pcmax.

For example, the uplink transmission power information calculation unit 104 is configured to calculate the uplink transmission power information of the serving cell using a parameter that can be dynamically changed, and the signal transmitting unit 101 is configured to include, in control information in which the uplink transmission power information is set, identification information for identifying a parameter used for calculation of the uplink transmission power information, and to transmit the control information including the identification information to the base station. Uplink transmission in the serving cell is not performed, and the uplink transmission power information may be uplink transmission power information for the serving cell in which the uplink transmission is not performed.

The upper transmission power information calculation unit 104 may be configured to calculate the uplink transmission power information of the serving cell in which the uplink transmission is not performed using a default parameter, and the signal transmission unit 101 may be configured to generate the control information in which the uplink transmission power information is set and transmit the control information to the base station.

The uplink transmission power information calculation unit 104 may be configured to calculate the uplink transmission power information of the serving cell in which the uplink transmission is not performed using the parameter applied to the uplink transmission in the random access procedure, and may be configured to generate the control information in which the uplink transmission power information is set and transmit the control information to the base station.

The uplink transmission power information calculation unit 104 may be configured to calculate the uplink transmission power information of the serving cell in the case where the uplink transmission of the serving cell is not performed using the parameter applied to uplink transmission in a serving cell, and the signal transmitting unit 101 may be configured to generate the control information in which the uplink transmission power information is set and transmit the control information to the base station.

The uplink transmission power information calculation unit 104 may be configured to calculate the uplink transmission power information of the serving cell using the parameter received by a downlink control signal in the serving cell in which the uplink transmission is not performed, and the signal transmitting unit 101 may be configured to generate the control information in which the uplink transmission power information is set and transmit the control information to the base station.

<Base Station 10>

Figure 10:
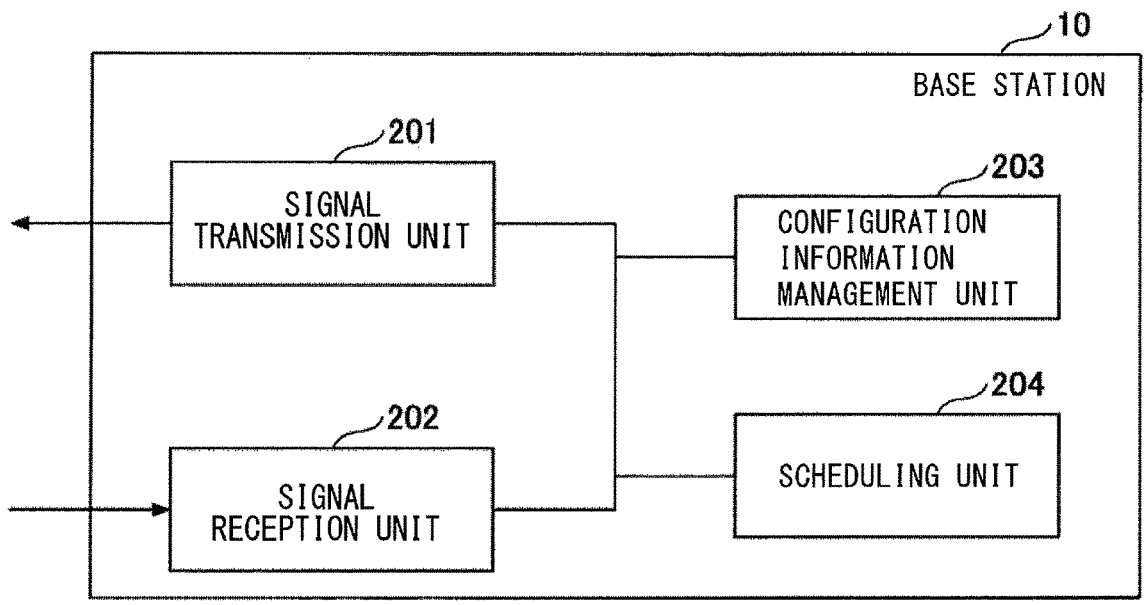
FIG. 10 is a diagram illustrating an example of a functional configuration of a base station 10 according to an embodiment.

FIG. 10 is a diagram illustrating an example of a functional configuration of a base station 10. As illustrated in FIG. 10, the base station 10 includes a signal transmission unit 201, a signal reception unit 202, a configuration information management unit 203, and a scheduling unit 204. The functional configuration shown in FIG. 10 is only one example. As long as the operation according to the present embodiment can be executed, the name of the functional classification and the functional portion may be any one. The signal transmission unit 201 may be referred to as a transmitter, and the signal reception unit 202 may be referred to as a receiver.

The signal transmission unit 201 includes a function that generates a signal to be transmitted to the user equipment UE side and transmits the signal by radio. The signal reception unit 202 includes a function for receiving various signals transmitted from the user equipment UE and acquiring information of a higher layer, for example, from the received signal. The signal transmission unit 201 and the signal reception unit 202 have a function of carrier aggregation.

The configuration information management unit 203 stores various configuration information to be transmitted to the user equipment UE, various configuration information received from the user equipment UE, and preconfigured configuration information. The scheduling unit 204 includes a function for scheduling and transmission power control based on a PHR signal received from the user equipment UE through the signal reception unit 202.

<Hardware Configuration>

The block diagram (FIGS. 9 to 10) used in the description of the above-described embodiment illustrates a block of functional units. These functional blocks (components) are implemented by any combination of hardware and/or software. Further, the means for implementing each functional block is not particularly limited. That is, each functional block may be implemented by one device with a physical and/or logical combination of elements, or may be implemented by two or more devices that are physically and/or logically separated and connected directly and/or indirectly (e.g., wired and/or radio).

Figure 11:
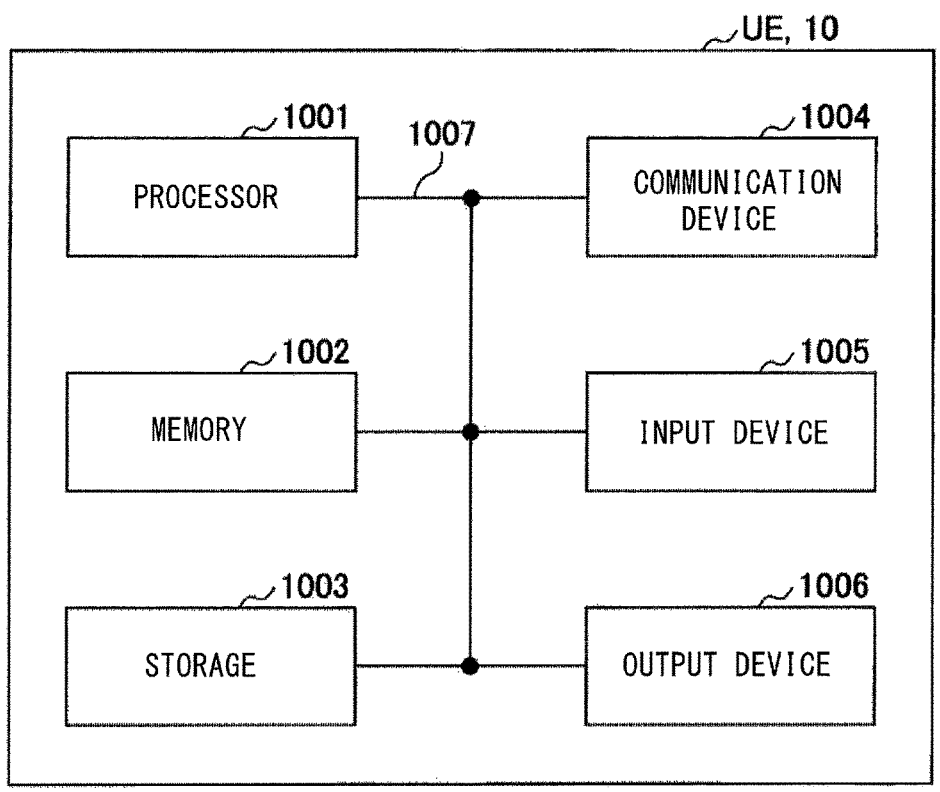
FIG. 11 is a diagram illustrating an example of a hardware configuration of a base station 10 and a user equipment UE according to an embodiment.

For example, any of the user equipment UE and the base station 10 according to an embodiment of the present invention may function as a computer performing processing according to the present embodiment. FIG. 11 is a diagram illustrating an example of a hardware configuration of a user equipment UE and a base station 10 according to the present embodiment. Each of the aforementioned user equipment UE and base station 10 may be physically configured as a computer device including a processor 1001, a memory 1002, a storage 1003, a communication device 1004, an input device 1005, an output device 1006, a bus 1007, and the like.

In the following description, the term "device" can be read as a circuit, device, unit, etc. The hardware configuration of the user equipment UE and the base station 10 may be configured to include one or more of the devices illustrated as 1001-1006 in the figure, or may be configured without some devices.

Each function in the user equipment UE and the base station 10 is realized by having the processor 1001 read a predetermined software (program) on hardware such as the processor 1001, the memory 1002, and the like, so that the processor 1001 performs an operation and controls communication by the communication device 1004, reading and/or writing of data in the memory 1002 and the storage 1003.

The processor 1001, for example, operates an operating system to control the entire computer. The processor 1001 may be comprised of a central processing unit (CPU: Central Processing Unit) including interfaces with peripheral devices, control devices, computing devices, registers, and the like.

The processor 1001 also reads programs (program code), software modules or data from storage 1003 and/or communication device 1004 into memory 1002 and performs various processing in accordance therewith. As a program, a program that causes a computer to execute at least a portion of the operation described in the above-described embodiment is used. For example, the signal transmission unit 101, the signal reception unit 102, the configuration information management unit 103, and the uplink transmission power information calculation unit 104 of the user equipment UE illustrated in FIG. 9 may be implemented by a control program stored in the memory 1002 and operated by the processor 1001. The signal transmission unit 201, the signal reception unit 202, the configuration information managing unit 203, and the scheduling unit 204 of the base station 10 illustrated in FIG. 10 may be implemented by a control program stored in the memory 1002 and operated by the processor 1001. Although the various processes described above have been described as being executed in one processor 1001, they may be executed simultaneously or sequentially by two or more processors 1001. The processor 1001 may be implemented in one or more chips. The program may be transmitted from the network via a telecommunications line.

The memory 1002 is a computer readable storage medium, and may be comprised of at least one such as, for example, ROM (Read Only Memory), EPROM (Erasable Programmable ROM), EEPROM (Electrically Erasable Programmable ROM), RAM (Random Access Memory). The memory 1002 may be referred to as a register, cache, main memory (main storage device), or the like. The memory 1002 may store programs (program code), software modules, etc. executable for executing processing according to one embodiment of the present invention.

Storage 1003 is a computer readable storage medium and may be comprised of, for example, at least one of an optical disk, such as a CD-ROM (Compact Disc ROM), a hard disk drive, a flexible disk, an optical magnetic disk (e.g., a compact disk, a digital versatile disk, a Blu-ray™ disk, a smart card, a flash memory (e.g., a card, a stick, a key drive), a Floppy™ disk, a magnetic strip, or the like. Storage 1003 may be referred to as an auxiliary storage device. The storage medium described above may be, for example, a database including memory 1002 and/or storage 1003, a server, or other suitable medium.

Communication device 1004 is a hardware (transceiver device) for communicating between computers over a wired and/or radio network, and is also referred to, for example, as a network device, a network controller, a network card, a communication module, and the like. For example, the signal transmission unit 101 and the signal reception unit 102 of the user equipment UE may be implemented in the communication device 1004. The signal transmission unit 201 and the signal reception unit 202 of the base station 10 may be implemented in the communication device 1004.

The input device 1005 is an input device (e.g., a keyboard, a mouse, a microphone, a switch, a button, a sensor, etc.) that receives an external input. Output device 1006 is an output device (e.g., a display, speaker, LED lamp, etc.) that performs outgoing output. The input device 1005 and the output device 1006 may be of an integrated configuration (e.g., a touch panel).

Each device, such as processor 1001 and memory 1002, is connected by a bus 1007 for communicating information. The bus 1007 may be comprised of a single bus or may be comprised of different buses between devices.

In addition, the user equipment UE and the base station 10 may each include hardware such as a microprocessor, a digital signal processor (DSP), an ASIC (Application Specific Integrated Circuit), a PLD (Programmable Logic Device), and a FPGA (Field Programmable Gate Array), wherein the hardware may implement some or all of the functional blocks. For example, processor 1001 may be implemented in at least one of these hardware.

Summary of Embodiments

As described above, in accordance with the present embodiment, there is provided a user equipment in a radio communication system including the user equipment and a base station, including:

an uplink transmission power information calculation unit configured to calculate uplink transmission power information of a serving cell using a parameter that may be changed; and a signal transmission unit configured to include, in control information in which the uplink transmission power information is set, identification information for identifying a parameter used for calculation of the uplink transmission power information, and to transmit the control information in which the identification information is included to the base station.

According to the above configuration, in the serving cell in which the uplink transmission is not performed, the base station can grasp the parameters used by the user equipment to calculate the uplink transmission power information.

Uplink transmission in the serving cell is not performed, and the uplink transmission power information is uplink transmission power information on the serving cell in which uplink transmission is not performed. Even with this configuration, in a serving cell in which uplink transmission is not performed, the base station can grasp the parameters used by the user equipment to calculate the uplink transmission power information.

Further, according to the present embodiment, there is provided a user equipment in a radio communication system including the user equipment and a base station, comprising:

an uplink transmission power information calculation unit configured to calculate uplink transmission power information of a serving cell in which uplink transmission is not performed using a default parameter; and a signal transmission unit configured to generate control information in which the uplink transmission power information is set, and to transmit the control information to the base station.

Further, according to the present embodiment, there is provided a user equipment in a radio communication system including the user equipment and a base station, comprising:

an uplink transmission power information calculation unit configured to calculate uplink transmission power information of a serving cell in which uplink transmission is not performed using a parameter applied to uplink transmission in a random access procedure; and a signal transmission unit configured to generate control information in which the uplink transmission power information is set, and to transmit the control information to the base station.

Further, according to the present embodiment, there is provided a user equipment in a radio communication system including the user equipment and a base station, comprising:

an uplink transmission power information calculation unit configured to calculate uplink transmission power information of a serving cell in which uplink transmission is not performed in the serving cell using a parameter applied to uplink transmission in the serving cell; and a signal transmission unit configured to generate control information in which the uplink transmission power information is set, and to transmit the control information to the base station.

Further, according to the present embodiment, there is provided a user equipment in a radio communication system including the user equipment and a base station, comprising:

an uplink transmission power information calculation unit configured to calculate uplink transmission power information of a serving cell using a parameter received by a downlink control signal in the serving cell in which uplink transmission is not performed; and a signal transmission unit configured to generate control information in which the uplink transmission power information is set, and to transmit the control information to the base station.

The configuration of any of the above user equipments allows the base station to grasp the parameters used by the user equipment to calculate the uplink transmission power information in a serving cell in which uplink transmission is not performed.

Supplement to Embodiments

While the embodiment of the present invention has been described, the disclosed invention is not limited to such an embodiment, and various variations, modifications, alterations, and substitutions could be conceived by those skilled in the art. While specific examples of numerical values are used in order to facilitate understanding of the invention, these numerical values are examples only and any other appropriate values may be used unless otherwise stated particularly. The classification of items in the description is not essential in the present invention, and features described in two or more items may be used in combination, and a feature described in a certain item may be applied to a feature described in another item (unless contradiction occurs). It is not always true that the boundaries of the functional units or the processing units in the functional block diagram correspond to boundaries of physical components. The operations of a plurality of functional units may be physically performed by a single component. Alternatively, the operations of the single functional unit may be physically performed by a plurality of components. The orders in the sequence and the flowchart described in the embodiment may be switched unless contradiction occurs. For convenience of explanation of processing, the user equipment UE and the base station 10 have been explained using functional block diagrams. However, these devices may be implemented by hardware, software, or a combination thereof. The software that operates by a processor included in the user equipment UE according to the embodiment of the present invention and the software that operates by a processor included in the base station 10 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, and other appropriate storage media.

Transmission of the information is not limited to the aspects/embodiments described in the invention, but may be performed by other methods. For example, transmission of the information may be performed by physical layer signaling (such as downlink control information (DCI) or uplink control information (UCI)), upper layer signaling (such as radio resource control (RRC) signaling, medium access control (MAC) signaling, broadcast information (such as a master information block (MIB) or a system information block (SIB)), other signaling, or a combination thereof. The RRC message may be referred to as RRC signaling. An RRC message may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing procedures, sequences, flowcharts and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station 10 in this specification may be performed by an upper node thereof in some cases. In a network including one or more network nodes including a base station, various operations which are performed to communicate with a user equipment UE can be apparently performed by the base station and/or network nodes (for example, an MME or an S-GW can be considered but the network nodes are not limited thereto) other than the base station. A case in which the number of network nodes other than the base station is one has been described above, but a combination of plural different network nodes (for example, an MME and an S-GW) may be used.

The aspects described in this specification may be used alone, may be used in combination, or may be switched with implementation thereof.

The user equipment UE may also be referred to as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or several appropriate terms by those skilled in the art.

The base station 10 may be referred to as an NodeB (NB), an enhanced NodeB (eNB), a base station, a gNB or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

Although details of the present invention have been described, it is clear for the person skilled in the art that the invention is not limited to the above-mentioned embodiments in the description. The present invention can be implemented as modifications and changed forms without departing from the spirit and scope of the present invention as defined by the scope of the claims. Therefore, the description of the present specification is for the purpose of illustration and does not have any restrictive meaning to the present invention.

EXPLANATION OF SYMBOLS

101 Signal transmission unit
102 Signal reception unit
103 Configuration Information Management unit
104 Uplink transmission power information calculation unit
201 Signal transmission unit
202 Signal reception unit
203 Configuration Information Management unit
204 Scheduling unit
1001 Processor
1002 Memory
1003 Storage
1004 Communication device
1005 Input device
1006 Output device

The invention claimed is:

1. A terminal comprising:
a processor that calculates a power headroom that is not based on an actual transmission using an index of a reference signal used for pathloss calculation; and
a transmitter that generates control information in which the power headroom is set, and that transmits the control information to a base station,
wherein the index is a specific index of a plurality of indexes configured from the base station.

2. The terminal according to claim 1, wherein the processor calculates the power headroom that is not based on the actual transmission using an index of a parameter set and the index of the reference signal used for pathloss calculation.

3. A method executed by a terminal, the method comprising:
calculating a power headroom that is not based on an actual transmission using an index of a reference signal used for pathloss calculation;
generating control information in which the power headroom is set; and
transmitting the control information to a base station,
wherein the index is a specific index of a plurality of indexes configured from the base station.

4. The method according to claim 3, wherein the terminal calculates the power headroom that is not based on the actual transmission using an index of a parameter set and the index of the reference signal used for pathloss calculation.

* * * * *